(12) United States Patent
Leu et al.

(10) Patent No.: US 7,014,343 B2
(45) Date of Patent: Mar. 21, 2006

(54) LIGHT GUIDE PLATE WITH DIFFUSING PROTRUSIONS

(75) Inventors: Charles Leu, Fremont, CA (US);
Mi-Chien Chen, Tu-Chen (TW);
Tai-Cheng Yu, Tu-chen (TW);
Ga-Lane Chen, Fremont, CA (US);
Ming-Hsuan Liu, Tu-chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 73 days.

(21) Appl. No.: 10/731,042

(22) Filed: Dec. 8, 2003

(65) Prior Publication Data

US 2004/0114347 A1    Jun. 17, 2004

(30) Foreign Application Priority Data

Dec. 6, 2002   (TW) ............................. 91135352 A

(51) Int. Cl.
*F21V 7/04* (2006.01)
(52) U.S. Cl. ..................... 362/331; 362/619
(58) Field of Classification Search ............. 362/31, 362/330, 331, 558
See application file for complete search history.

(56) References Cited

U.S. PATENT DOCUMENTS

| 6,174,064 B1 * | 1/2001 | Kalantar et al. ............. 362/31 |
| 6,406,158 B1 * | 6/2002 | Ohkawa ..................... 362/31 |
| 6,505,959 B1 * | 1/2003 | Masaki et al. ............. 362/339 |

* cited by examiner

*Primary Examiner*—Ali Alavi
(74) *Attorney, Agent, or Firm*—Wei Te Chung

(57) ABSTRACT

A light guide plate (10) includes a transparent plate (20), and a plurality of diffusing protrusions (30). The transparent plate includes an emitting surface (21), and a bottom surface (23) opposite to the emitting surface. The diffusing protrusions are distributed evenly on the emitting surface of the transparent plate, and are integrated with the transparent plate. The diffusing protrusions are hemispherical or sub-hemispherical, and a diameter of each diffusing protrusion is in the range from 10 μm~50 μm. The light guide plate provides high emitting brightness and uniformity. The diffusing protrusions can diffuse light beams emitting from the emitting surface of the transparent plate, in order to achieve a plane light source having even brightness. The present Invention also discloses a method for fabricating the light guide plate.

9 Claims, 4 Drawing Sheets

LIGHT GUIDE PLATE WITH DIFFUSING PROTRUSIONS

BACKGROUND OF THE INVENTION

1. Field of the Invention

The present invention relates to light guide plates used in liquid crystal displays, and to methods for fabricating light guide plates.

2. Description of the Prior Art

A liquid crystal display is capable of displaying a clear and sharp image through millions of pixels of image elements. It has thus been applied to various electronic equipment in which messages or pictures need to be displayed, such as in mobile phones and notebook computers. However, liquid crystals in the liquid crystal display do not themselves emit light. Rather, the liquid crystals have to be lit up by a light source so as to clearly and sharply display text and images. The light source may be ambient light, or part of a backlight system attached to the liquid crystal display.

A conventional backlight system generally comprises a plurality of components, such as a light source, a reflective plate, a light guide plate, a diffusion plate, and a prism layer. Among these components, it is generally believed that the light guide plate is the most crucial component in determining the performance of the backlight system. The light guide plate serves as an instrument for receiving light beams from the light source, and for evenly distributing the light beams over the entire light guide plate through reflection and diffusion. In order to keep light evenly distributed over an entire surface of the associated liquid crystal display, the diffusion plate is generally arranged on top of the light guide plate.

Taiwan Patent Publication No. 486101 issued on May 1, 2002 discloses a backlight system, which is represented in FIG. 6. The backlight system 100 generally comprises a prism layer 130, a diffusion plate 120, a light guide plate 110, and a linear light source 140. The linear light source 140 is arranged at a side of the light guide plate 110. The prism layer 130 comprises first and second prism plates 131, 133. Light beams from the light source 140 are directed to emit from a surface of the diffusion plate 120 via the light guide plate 110. The emitted light beams eventually penetrate the prism layer 130.

The light guide plate 110 further includes a reflective layer 150 deposited on a bottom thereof by means of sputtering.

The backlight system 100 is provided with the diffusion plate 120 so that the light beams are evenly distributed and can provide uniform luminance. However, the diffusion plate 120 is an extra element that adds to costs of raw materials and costs of manufacturing. In addition, when the light beams travel from the light guide plate 110 and from the diffusion plate 120, they must cross two interfaces. Each interface has two media with different reflective indices. Portions of the light beams are reflected and absorbed, and the luminance of the backlight system 100 is reduced accordingly. As a result, optical performance of the backlight system 100 is diminished.

SUMMARY OF THE INVENTION

It is therefore an objective of the present invention to provide a light guide plate which provides excellent diffusion of light.

In order to achieve the above objective, a light guide plate in accordance with the present invention generally includes a transparent plate, and a plurality of diffusing protrusions. The transparent plate includes an emitting surface and a bottom surface opposite to the emitting surface. The diffusing protrusions are distributed evenly on the emitting surface of the transparent plate and are integrated with the transparent plate. The diffusing protrusions are hemispherical or sub-hemispherical, and a diameter of each diffusing protrusion is in the range from 10 $\mu$m~50 $\mu$m.

The diffusing protrusions of the light guide plate can diffuse light beams emitting from the emitting surface of the transparent plate, in order to achieve a plane light source having even brightness. Moreover, the dots on the bottom surface of the transparent plate can scatter and reflect incident light beams, so as to totally eliminate internal reflection of light beams and make the light beams evenly emit from the emitting surface.

According to another aspect of the present invention, a preferred method for fabricating a light guide plate includes the steps of fabricating a mother mold, forming a cavity in the mother mold, forming a plurality of holes under the cavity, fabricating a light guide plate using the mold with the cavity, and forming a plurality of dots on a surface of the light guide plate.

Other objects, advantages and novel features of the present invention will be apparent from the following detailed description of preferred embodiments thereof with reference to the attached drawings, in which:

DETAILED DESCRIPTION OF THE INVENTION

Figure 1:
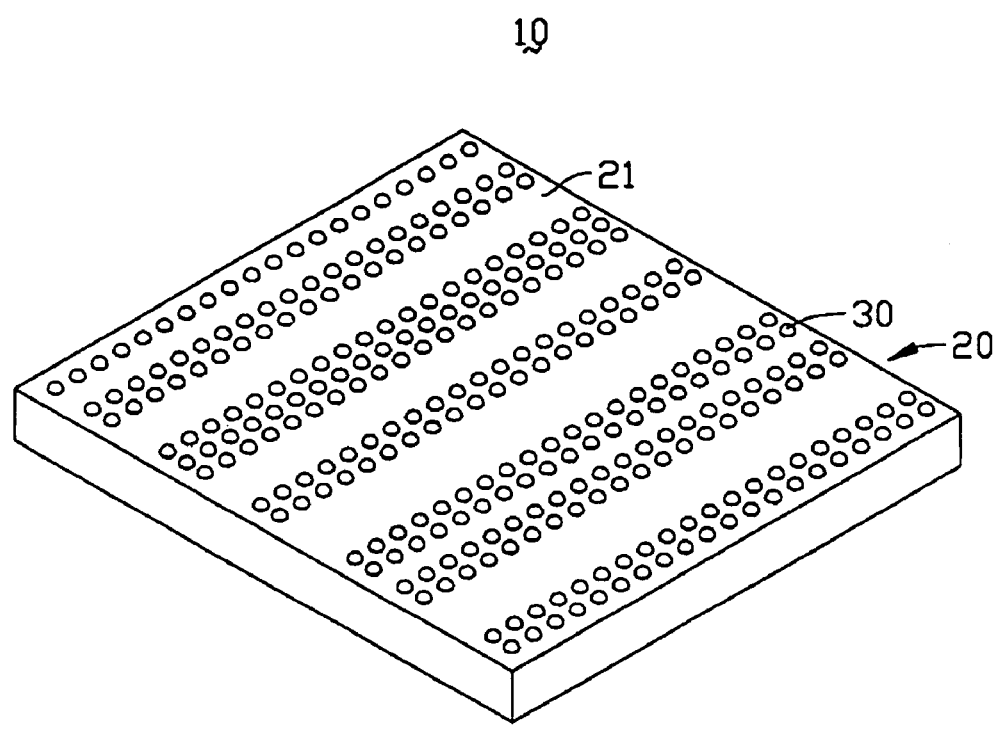
FIG. 1 is an isometric view of a light guide plate in accordance with the present invention.
Figure 2:
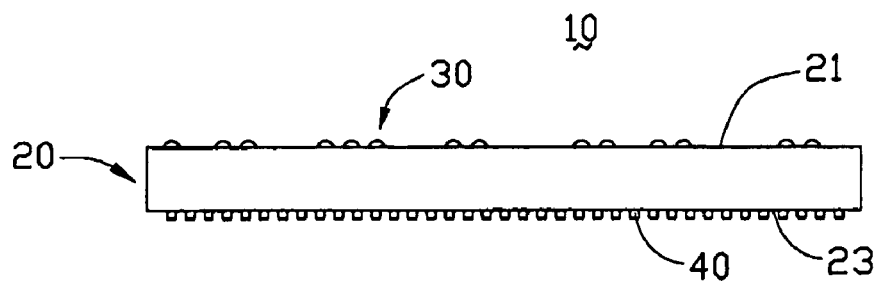
FIG. 2 is a side elevation of FIG. 1.
Figure 3:
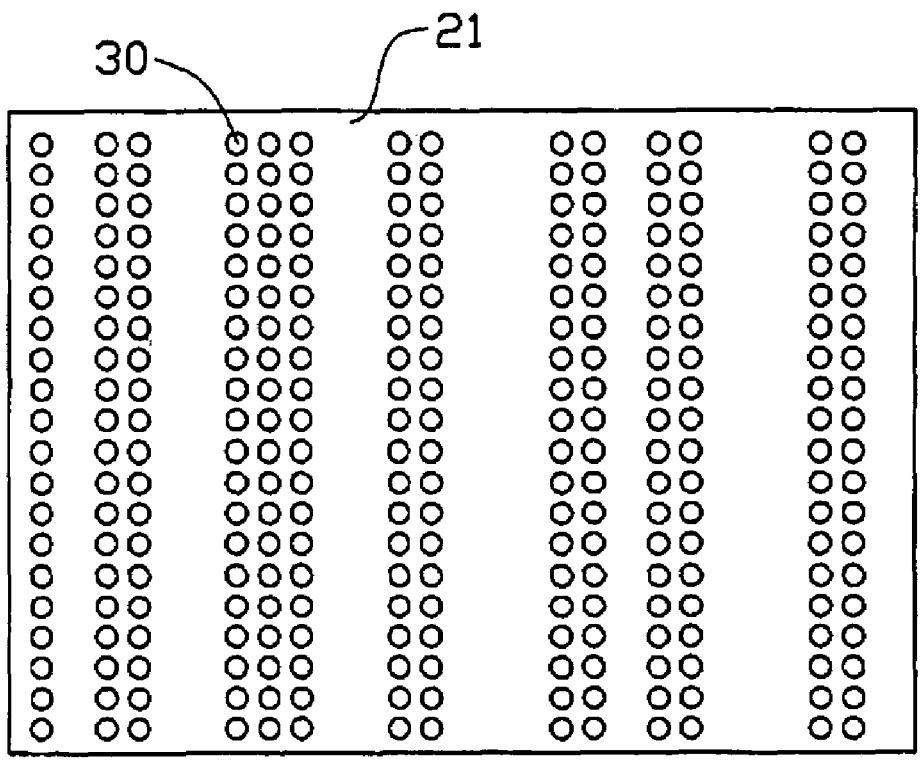
FIG. 3 is a top elevation of FIG. 1, showing a distribution of diffusing protrusions of the light guide plate.

Referring to FIGS. 1, 2 and 3, a light guide plate 10 in accordance with a preferred embodiment of the present invention includes a transparent plate 20 on which a plurality of diffusing protrusions 30 is formed. The transparent plate 20 is generally a flat panel made from polymethyl methacrylate (PMMA). Alternatively, The transparent plate 20 may be generally cuneiform. The transparent plate 20 includes an incident surface (not labeled), an emitting surface 21, and a bottom surface 23. The incident surface faces a light source (not shown), and receives light beams from the light source. The light beams from the incident surface are then directed to and emitted from the emitting surface 21. The incident surface is perpendicular to the bottom surface 23, while the emitting surface 21 is opposite to the bottom surface 23.

The diffusing protrusions 30 are evenly distributed on the emitting surface 21, and are integrally formed with the transparent plate 20. In general, the diffusing protrusions are made of an organic material such as PMMA, polycarbonate or mCOC(metallocene Cyclic Olefin Copolymer). The diffusing protrusions 30 are hemispherical or sub-hemispherical. An arc of any vertical cross-section of each diffusing protrusion 30 subtends an angle in the range from 90~180°. A diameter of each diffusing protrusions 30 is in the range from 10 µm~50 µm.

Figure 4:
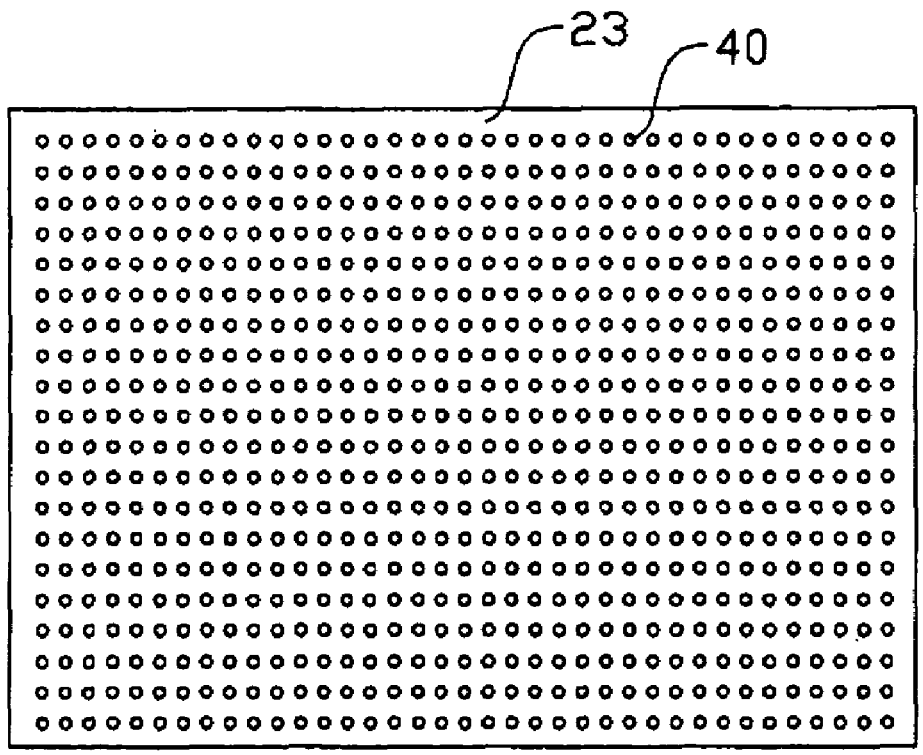
FIG. 4 is a bottom elevation of FIG. 1, showing a distribution of dots of the light guide plate.

Referring to FIGS. 2 and 4, the light guide plate 10 further includes a plurality of dots 40. The dots 40 are evenly distributed on the bottom surface 23 of the transparent plate 20. The dots 40 are made of a material having a high light scattering ratio. The dots 40 can diffuse light beams coming from the incident surface of the light guide plate 10, so that the light beams are evenly emitted from the emitting surface 21.

The dots 40 are evenly distributed on the bottom surface 23 of the light guide plate 10, and face outwardly away from the bottom surface 23. The dots 40 are generally cylindrical, hemispherical, sub-hemispherical, parallelepiped-shaped or frustum-shaped. The dots 40 help diffuse complete reflection of light beams within the light guide plate 10. That is, incident light beams traveling to the dots 40 are diverted by the dots 40, so that they emit from the emitting surface 21 of the light guide plate 10 instead of being reflected therefrom.

In summary, the diffusing protrusions 30 of the light guide plate 10 can diffuse the light beams emitting from the emitting surface 21 of the transparent plate 20, in order to achieve a plane light source having even brightness. Moreover, the dots 40 on the bottom surface 23 of the transparent plate 20 can scatter and reflect incident light beams, so as to totally eliminate internal reflection of the light beams and make the light beams evenly emit from the emitting surface 21.

Figure 5:
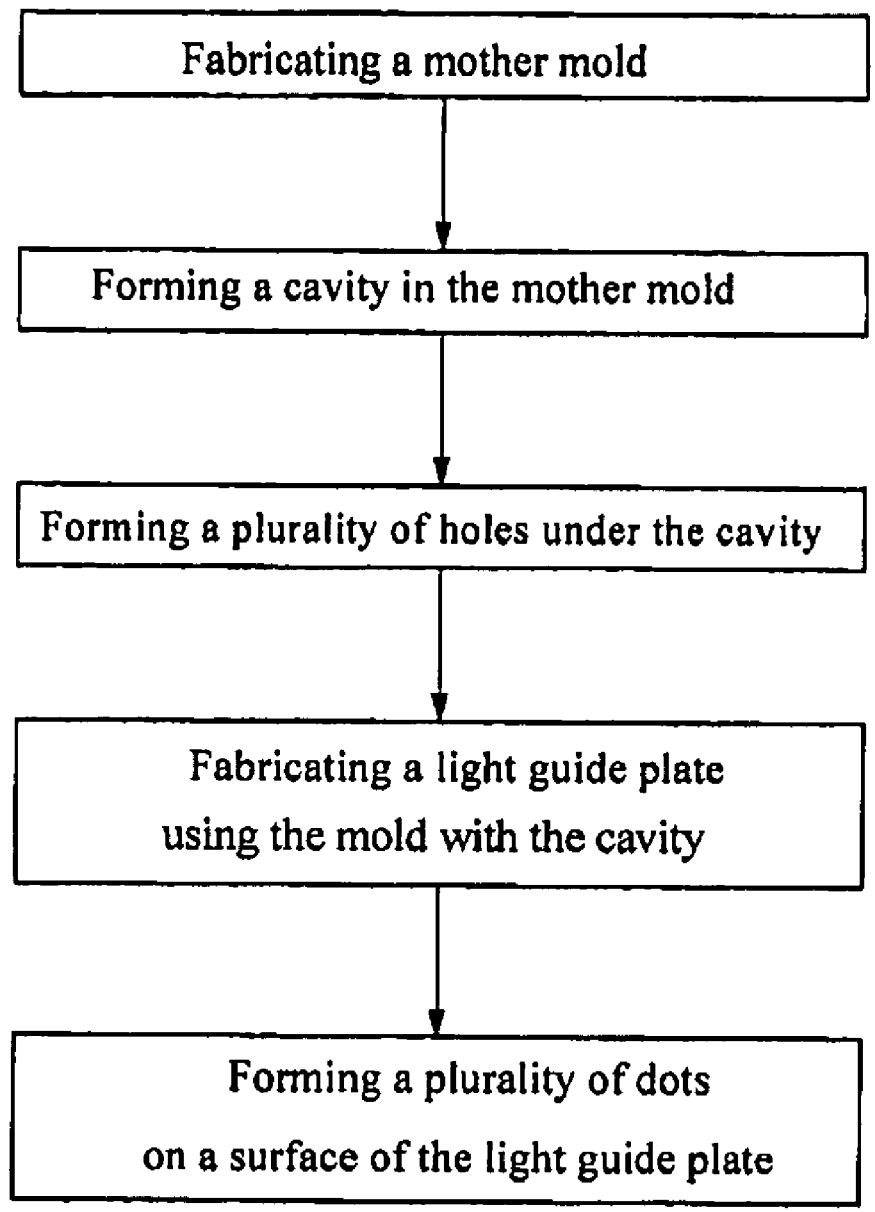
FIG. 5 is a flow chart of a method for fabricating a light guide plate in accordance with the present invention.
Figure 6:
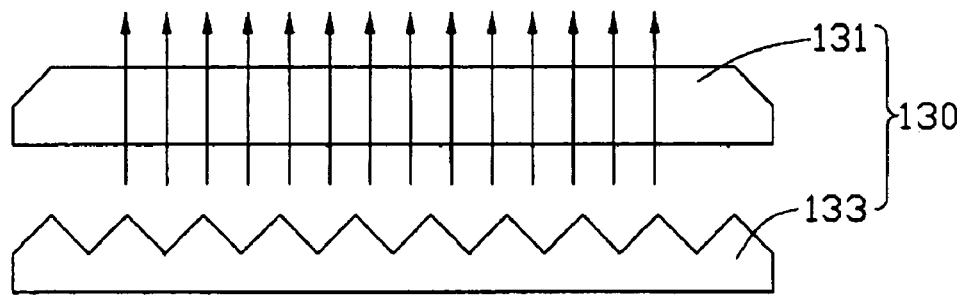
FIG. 6 is an exploded, side elevation of a conventional backlight system, showing light paths thereof.
Figure 6:
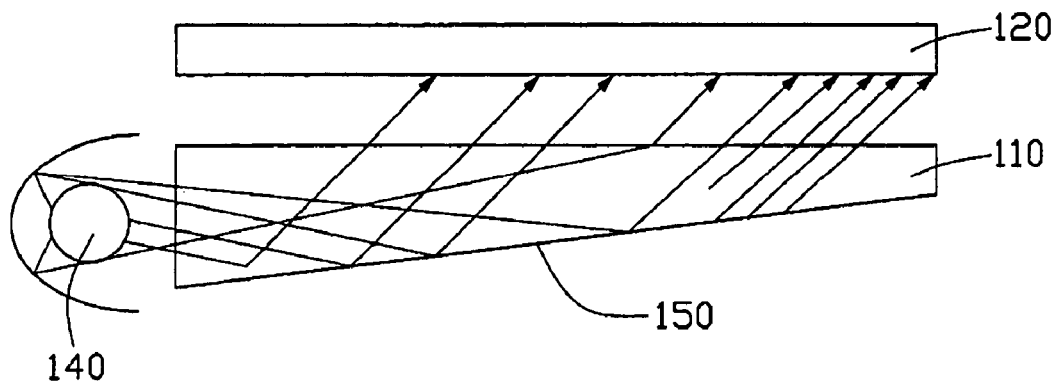

Referring to FIG. 5, a method for fabricating a light guide plate in accordance with the present invention comprises the steps of fabricating a mother mold, forming a cavity in the mother mold, forming a plurality of holes under the cavity, fabricating a light guide plate using the mold with the cavity, and forming a plurality of dots on a surface of the light guide plate. Details are as follows:

First, fabricating a mother mold. The material of the mother mold is a metal or an alloy having high rigidity.

Second, forming a cavity in the mother mold.

Third, forming a plurality of holes under the cavity. The holes are hemispherical or sub-hemispherical. An arc of any orthogonal cross-section of each hole subtends an angle in the range from 90~180°. A diameter of each hole is in the range of 10 µm~50 µm.

Fourth, fabricating a light guide plate by way of an integrated molding method. Material used to form the light guide plate can be transparent synthetic resin or glass, or an organic material like PMMA, polycarbonate or mCOC. The material used fills the cavity and the holes. The formed light guide plate includes a plurality of diffusing protrusions located on a surface thereof, owing to the holes.

Fifth and finally, forming a plurality of dots on a surface of the light guide plate opposite to the surface on which the diffusing protrusions are located. The dots are made of a material with a high light scattering ratio, and can be cylindrical, hemispherical, sub-hemispherical, parallelepiped-shaped or frustum-shaped. The method of forming the dots is a printing process, chemical etching, or mechanical pressing.

It is to be further understood that even though numerous characteristics and advantages of the present invention have been set out in the foregoing description, together with details of the structure, function and method of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A light guide plate comprising:
   a transparent plate comprising an emitting surface; and
   a plurality of diffusing protrusions provided evenly on the emitting surface of the transparent plate and integrated with the transparent plate;
   wherein the diffusing protrusions are hemispherical or sub-hemispherical, and a diameter of each diffusing protrusion is in the range from 10 µm~50 µm.

2. The light guide plate as recited in claim 1, wherein the transparent plate is generally a flat panel or generally cuneiform.

3. The light guide plate as recited in claim 1, wherein the diffusing protrusions are made of organic material.

4. The light guide plate as recited in claim 3, wherein the diffusing protrusions are made of polymethyl methacrylate (PMMA), polycarbonate or metallocene Cyclic Olefin Copolymer (mCOC).

5. The light guide plate as recited in claim 1, wherein the transparent plate is made of a transparent synthetic resin or glass.

6. The light guide plate as recited in claim 1, wherein an arc of any orthogonal cross-section of each diffusing protrusion subtends an angle in the range from 90~180°.

7. The light guide plate as recited in claim 1, wherein the diffusing protrusions are evenly distributed on the emitting surface of the transparent plate.

8. The light guide plate as recited in claim 1, further comprising a plurality of dots distributed on a bottom surface of the transparent plate.

9. The light guide plate as recited in claim 8, wherein the dots are evenly distributed on the bottom surface of the transparent plate.

* * * * *